United States Patent [19]

Orimo et al.

[11] Patent Number: 5,097,412
[45] Date of Patent: Mar. 17, 1992

[54] METHOD FOR SIMULATING THE OPERATION OF PROGRAMS IN A DISTRIBUTED PROCESSING SYSTEM

[75] Inventors: Masayuki Orimo, Kawasaki; Kinji Mori, Yokohama; Yasuo Suzuki, Ebina; Katsumi Kawano, Kawasaki; Minoru Koizumi, Yokohama; Kozo Nakai, Katsuta; Hirokazu Kasahima, Hitachi, all of Japan

[73] Assignee: Hitachi, Ltd., Tokyo, Japan

[21] Appl. No.: 184,395

[22] Filed: Apr. 21, 1988

[30] Foreign Application Priority Data

Apr. 24, 1987 [JP] Japan .................. 62-99754

[51] Int. Cl.⁵ ............................. G06F 11/34
[52] U.S. Cl. ................... 395/500; 364/230; 364/231.6; 364/264.3; 364/264; 364/DIG. 1; 395/800
[58] Field of Search ... 364/200 MS File, 900 MS File

[56] References Cited

U.S. PATENT DOCUMENTS

| | | | |
|---|---|---|---|
| 3,648,253 | 3/1972 | Mullery | 364/200 |
| 3,678,467 | 7/1972 | Nussbaum et al. | 364/200 |
| 3,763,474 | 10/1973 | Freeman et al. | 364/200 |
| 3,766,524 | 10/1973 | Maring | 364/200 |
| 4,149,243 | 4/1979 | Wallis | 364/200 |
| 4,183,083 | 1/1980 | Chatfield | 364/200 |
| 4,262,331 | 4/1981 | Freeland | 364/200 |
| 4,315,315 | 2/1982 | Kossiakoff | 364/518 |
| 4,393,446 | 7/1983 | Gurr | 364/200 |
| 4,403,286 | 9/1983 | Fry | 364/200 |
| 4,405,982 | 9/1983 | Ruhnan et al. | 364/200 |
| 4,466,063 | 8/1984 | Segarra | 364/200 |
| 4,486,829 | 12/1984 | Mori et al. | 364/200 |
| 4,495,562 | 1/1985 | Yamaji | 364/200 |
| 4,517,641 | 5/1985 | Pinheiro | 364/200 |
| 4,583,222 | 4/1986 | Fossum et al. | 364/200 |
| 4,677,587 | 6/1987 | Zemany | 364/900 |
| 4,698,751 | 10/1987 | Parvis | 364/200 |
| 4,703,481 | 10/1987 | Fremont | 364/200 |
| 4,740,895 | 4/1988 | Sargent et al. | 364/200 |
| 4,769,772 | 9/1988 | Dwyer | 364/200 |
| 4,814,978 | 3/1989 | Dennis | 364/200 |
| 4,837,676 | 6/1989 | Rosman | 364/200 |
| 4,845,665 | 7/1989 | Heath | 364/900 |
| 4,866,663 | 9/1989 | Griffin | 364/300 |
| 4,972,314 | 11/1990 | Getzinger | 364/200 |

OTHER PUBLICATIONS

Encyclopedia of Computer Science and Engineering by A. Ralston and E. Reilly, pp. 563, 564, Van Nostrand Reinhold Pub., 2nd ed., 1983.

Primary Examiner—Thomas C. Lee
Assistant Examiner—Eric Coleman
Attorney, Agent, or Firm—Antonelli, Terry, Stout & Kraus

[57] ABSTRACT

In a distributed processing system wherein a plurality of processors are connected by a transmission medium; a simulation method for a distributed processing system characterized by defining transmission delay times ascribable to the transmission medium, input/output data items and processing times of respective programs which are set in the system, and numbers of the processors in which the programs are stored.

6 Claims, 10 Drawing Sheets

DATA FORMAT (SYSTEM FLOW)

(PROGRAM RELATION TABLE)

METHOD FOR SIMULATING THE OPERATION OF PROGRAMS IN A DISTRIBUTED PROCESSING SYSTEM

BACKGROUND OF THE INVENTION

1. Field of the Invention

The present invention relates, in a distributed processing system for executing a series of processes with a plurality of programs, to a simulation method for evaluating the performances of the programs.

2. Description of the Prior Art

In a distributed processing system wherein a series of processes are distributively carried out by a plurality of processors connected to a common transmission path; a method in which programs for executing the series of processes respectively are distributively stored in the corresponding processors and in which the program of each processor is started when data items required for executing this program have been completely gathered from the transmission path into the processor, is disclosed in, for example, the official gazette of Japanese Patent Application Laid-open No. 146361/1982. This method makes it possible that the series of respective processes are distributively executed by the corresponding processors without needing an executive processor for managing the whole system.

As an expedient for simulating the system, there is a program package described in, for example, "HITAC Manual, GPSS, Introduction."

Regarding the distributed processing system referred to in the prior art, in case of designing the system, there has not been any method for previously evaluating how the individual programs operate, in other words, the performances, responses etc. of the programs. Therefore, how the system may be designed is difficult of evaluation, which has been problematic in the system design.

Besides, as the methods of simulating the system, there are the program packages in "HITAC Manual, GPSS" mentioned above, etc. With these techniques, however, the motion of the system must be first put into a model, according to which the sequence of the processes is described. This has led to the problem that the techniques cannot be easily applied.

SUMMARY OF THE INVENTION

An object of the present invention is to provide, in the distributed processing system, a simulation method for programs which facilitates the development of a system and which enhances the reliability of software.

In order to accomplish the object, the present invention includes an operation of providing each program the input/output data thereof, a processor for storing the program, and information on the processing time of the program beforehand, and including:

(1) joining any desired program with a program to which the output data of the desired program is input, and (2) adding the processing times given to the respective programs, in a designated program sequence.

In the present invention, by successively executing the aforementioned step (1), the starting flow of the series of programs (hereinafter, called "system flow") can be generated with respect to any desired program in such a manner that another program is started by the result of execution of the desired program and that a further program is started by the result of execution of the other program.

Moreover, the aforementioned step (2) is applied to the system flow generated by the step (1), whereby the processing time of the whole system flow can be calculated.

DETAILED DESCRIPTION OF THE PREFERRED EMBODIMENTS

Figure 2:
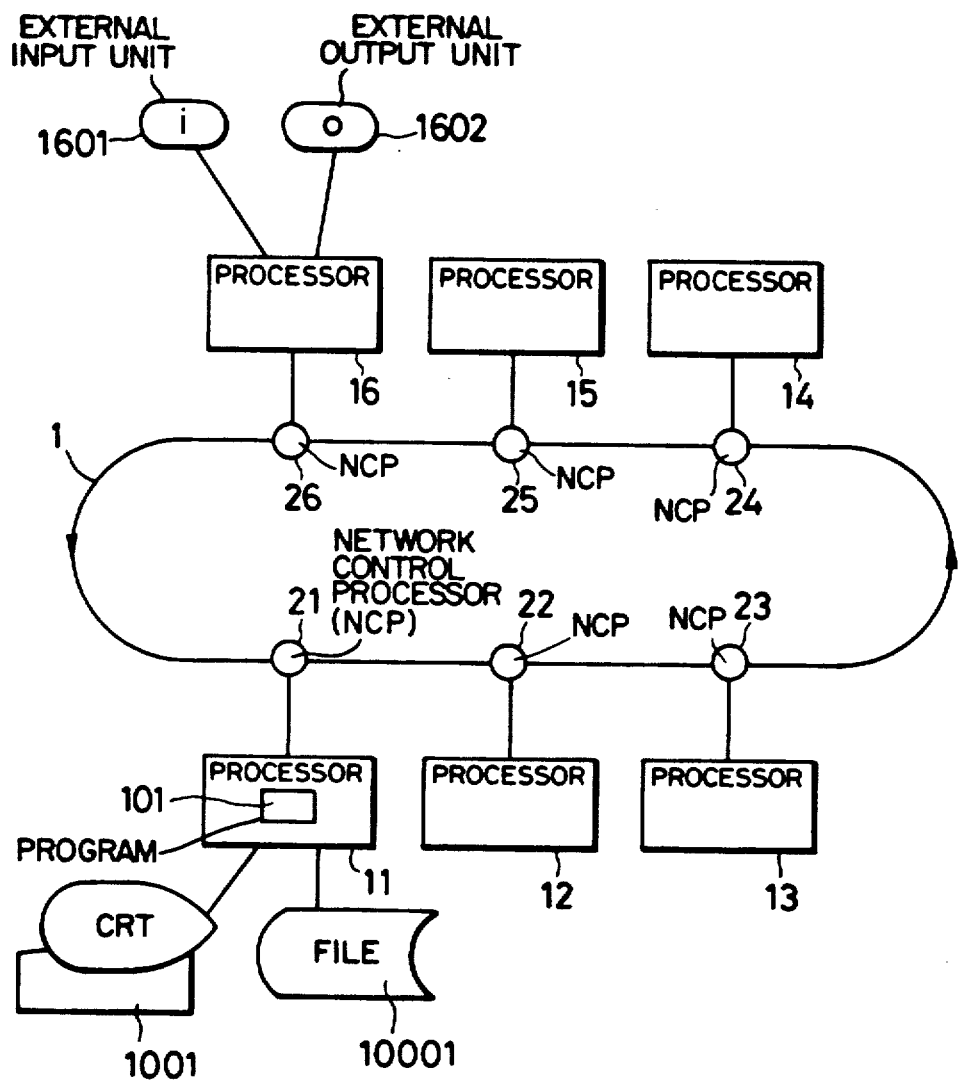
FIG. 2 is a system architecture diagram exemplifying a system to which the present invention is applied.

Now, the present invention will be described in detail in conjunction with embodiments. FIG. 2 is a whole architecture diagram of a system to which the method of the present invention is applied. Although, in the ensuing embodiments, a common transmission path for connecting individual processors will be illustrated as a single-loop transmission system by way of example, any of general transmission media may well be employed.

Referring to FIG. 2, numerals 11-16 indicate processors whose internal memories store application programs and which execute the programs, and numeral 1 indicates a unidirectional loop transmission path which transmits data in the direction of arrows. Numerals 21-26 denote network control processors (hereinbelow, termed "NCPs") which control the data transmission on the transmission path. The respective NCPs 21-26 and the corresponding processors 11-16 are connected bidirectionally. Processed results (data) in the processors 11-16 are broadcast onto the transmission path via the NCPs 21-26. Each of NCPs 21-26 decides if data flowing on the transmission path is necessary for a processor connected thereto, and it sends the data to the processor only when the data has been decided as being necessary. Each of the processors 11-16 starts the application program stored therein at the point of time at which all data items necessary for the execution of the program have been completely gathered. The started program executes a process by the use of the data items, and outputs the result of the process.

In this embodiment, the processor 11 is assumed to be a development system. A program 101 for performing the simulation method of the present invention is set in the processor 11, and a CRT terminal 1001 for a man-machine interface and a file 10001 for storing tables required for the execution of the method are connected to this processor. In addition, the processor 16 is an I/O managing processor, to which an external input unit 1601 and an external output unit 1602 are connected. This processor 16 fetches data from an external process through the external input unit 1601 and delivers the data onto the transmission path, while it fetches data from the transmission path and delivers the data to an external process through the external output unit 1602.

Figure 3:
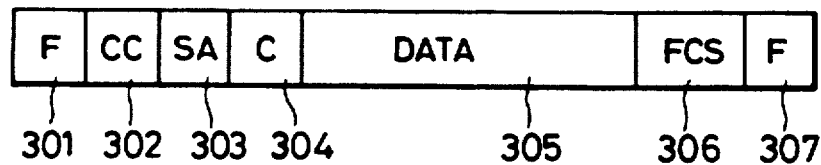
FIG. 3 is a diagram showing an example of the format of a message which is transmitted.

Shown in FIG. 3 is the format of data which flows on the transmission path. Symbol CC 302 denotes a content code, which is a code corresponding to the content of the data. On the basis of this content code, each NCP judges whether or not the received data is necessary for the processor connected to its own. Symbol SA 303 denotes an NCP address having sent the message, and symbol C 304 denotes a consecutive number required for transmission. DATA 305 indicates the data of the processed result of each application program, and FCS 306 indicates error sensing data. F 301 and F 307 denote flags which indicate the start and end of the message, respectively.

The present invention is directed toward a distributed processing system as explained above, and is intended to simulate the operations of the application programs in the case where these programs are set in the respective processors. Now, the simulation method of the present invention will be described with reference to FIG. 4–FIGS. 10(a) and 10(b).

Figure 4:
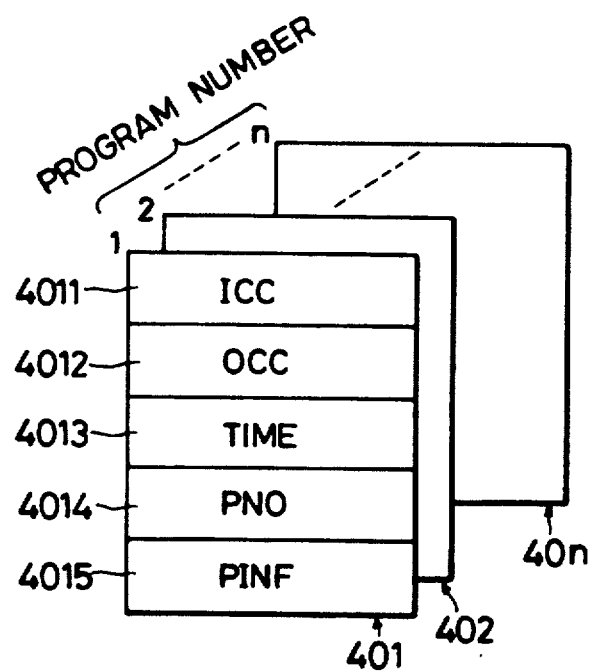
FIG. 4 and FIGS. 5(a) and 5(b) are diagrams showing examples of the formats of tables which are used in the present invention.
Figure 5A:
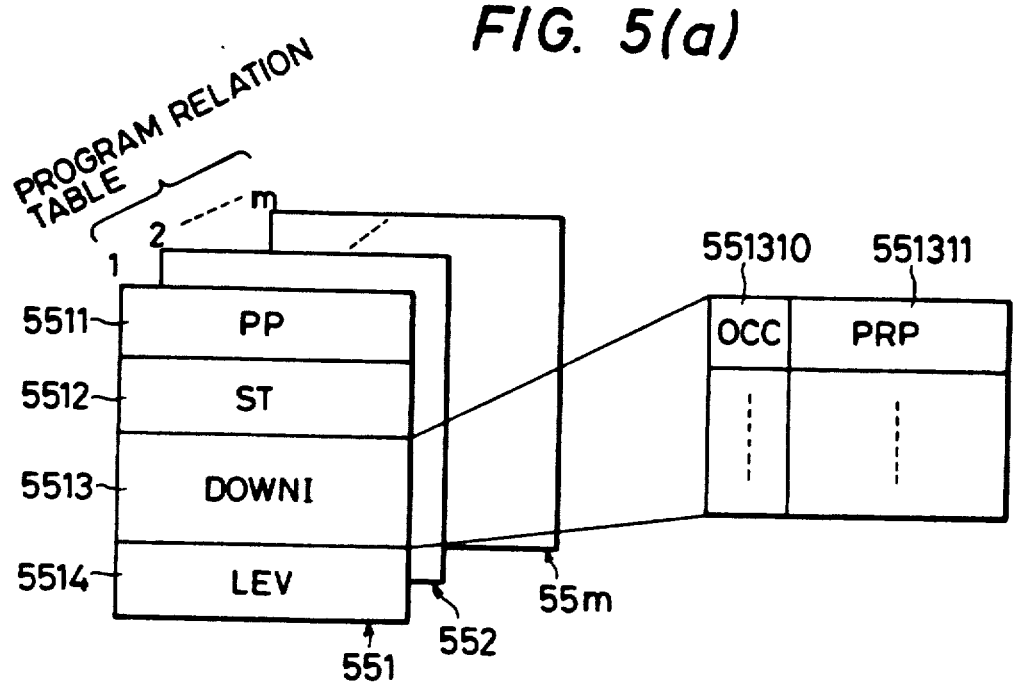
Figure 5B:
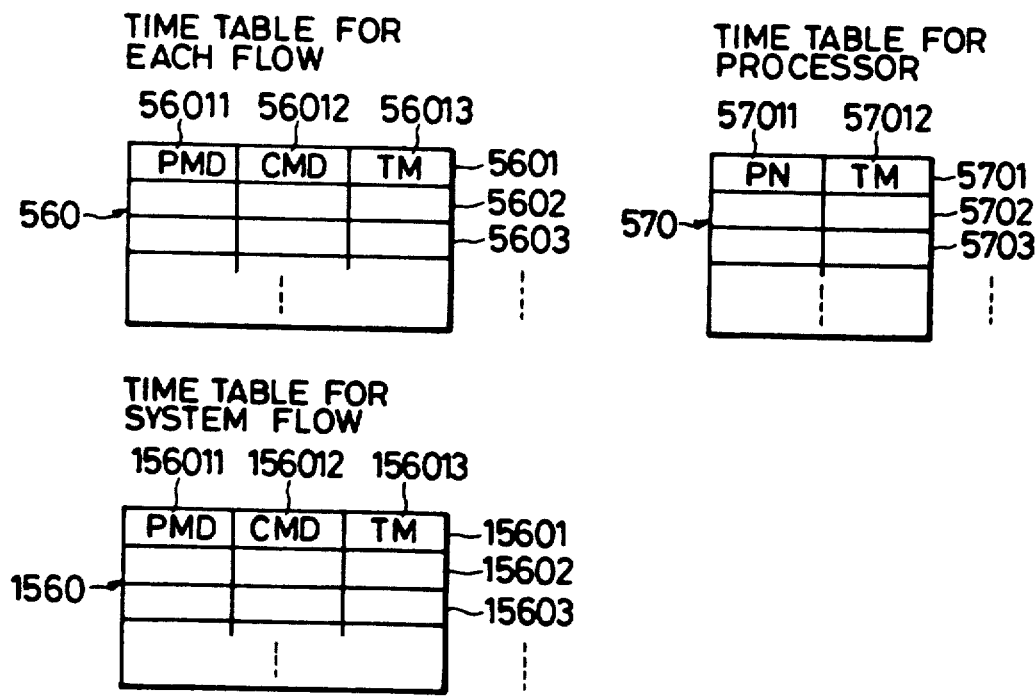

FIG. 4 and FIGS. 5(a) and 5(b) show the formats of the tables which are set in the file indicated at numeral 10001 in FIG. 2. FIG. 4 shows the table which stores information on the respective programs, and which shall hereinafter be called the "program constitution table." This table is made up of the tables (401, 402, . . . ) of the respective programs. In addition, the individual tables are assigned serial numbers, which shall be called "program Nos." Next, the format of the table 401 will be elucidated. The tables 402, . . . have the same format. Symbol ICC 4011 denotes an area in which the content code of data to serve as the input of the corresponding program is stored, while symbol OCC 4012 denotes an area in which the content code of the output data of the program is stored. Besides, TIME 4013 indicates an area for storing the processing time of the program, PNO 4014 an area for storing the processor No. of the processor in which the program is stored, and PINF 4015 an area for storing the attribute of the program (for example, the program identifier). Incidentally, the program constitution table shall be previously set before the execution of the method of the present invention. By way of example, this table can be set by keying-in the necessary information items from the CRT terminal (1001 in FIG. 2).

FIGS. 5(a) and 5(b) show the tables which are generated on the basis of the program constitution table shown in FIG. 4 by the method of the present invention. FIG. 5(a) shows the table indicative of the relations among the programs (hereinafter, called the "program relation table"). The program relation table is made up of the tables 551-55m of the respective programs, and these tables are identified by respectively assigned serial Nos. (program relation table Nos.). Next, the format of the table 551 will be elucidated. The tables 552-55m have the same format. The table 551 is configured of a program pointer PP 5511, a table status ST 5512, a downstream information DOWNI 5513, and a level area LEV 5514. The program pointer PP 5511 is an area for storing a pointer which indicates the position of the program corresponding to this table, within the program constitution table (FIG. 4), and it has the program No. set therein. The table status ST 5512 is an area for setting therein information which indicates whether this table is in a normal status or in a relay status. In the downstream information DOWNI 5513, there is stored the information of the program which lies downstream on the data flow of the program corresponding to this table. The area DOWNI is composed of content codes OCC 551310 which this program delivers as outputs, and pointers PRP 551311 which indicate the positions of the programs for receiving data items having the content codes as inputs, within the program constitution table. Concretely, the pointers PRP 551311 are the program Nos. of the program constitution table shown in FIG. 4.

FIG. 5(b) shows the tables which are generated on the basis of the program relation table shown in FIG. 5(a) during the execution of the simulation of the present invention, and which serve to store elasepsed times at the several stages of the simulation. The table 560 is a table (a time table for flows) which stores the elapsed times of a series of respective programs (hereinafter, called "system flows") that are successively started, and which is made up of rows 5601, 5602, . . . that correspond to the respective flows. The first row 5601 is composed of an area PMD 56011 for storing information which indicates an adjacent program lying upstream of a program being presently handled, an area CMD 56012 for storing information which indicates the program being presently handled, and an area TM 56013 for storing the elapsed time. The second row 5602, et seq. have the same composition as that of the first row 5601. In addition, the table 1560 is a table (a time table for previous-level flows) which serves to keep the contents of the table 560 and which has the same format as that of the table 560. The table 570 is a table (a time table for processors) which stores the elapsed times of the respective processors, and which is made up of rows 5701, 5702, . . . corresponding to the respective processors. The first row 5701 is composed of an area PN 57011 for storing processor No., and an area TM 57012 for storing the elapsed time. The second row 5702, et seq. have the same composition as that of the first row 5701.

Figure 1:
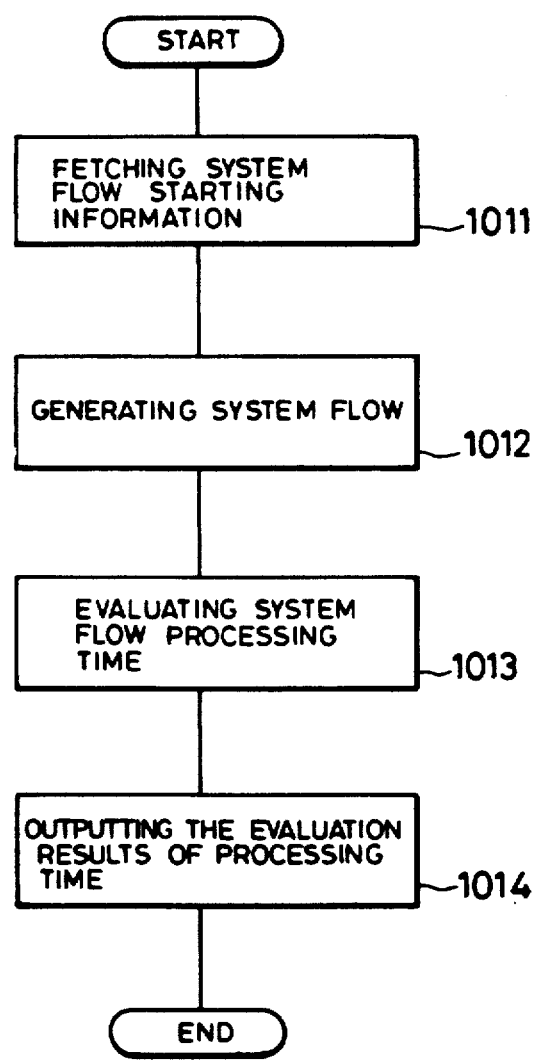
FIG. 1 is a diagram showing the general processing flow of a method according to the present invention.

FIG. 1 shows the processing flow of the program 101 within the processor 11 shown in FIG. 2. The program 101 carries out the simulation in accordance with inputs from the CRT terminal 1001. First, information which triggers a system flow (programs) for starting the simulation (the identifier of a program to be first started, or the content code of data to be input to the program) is fetched from the CRT terminal 1001 (step 1011). Subsequently, the system flow which is started by the trigger obtained at the step 1011 is generated on the basis of the contents of the program constitution table shown in FIG. 4 (step 1012). Thereafter, the processing time of the whole system flow is calculated (step 1013) on the basis of the system flow obtained at the step 1012, and the processing time information items (TIME 4013 in FIG. 4) and processor Nos. (PNO 4014 in FIG. 4) of the individual programs contained in the program constitution table. The calculated result is output to the CRT terminal 1001 (step 1014). Now, the processes of the steps 1012 and 1013 on this flow will be described in detail with reference to FIG. 6(a)–FIG. 10(b).

Figure 6A:
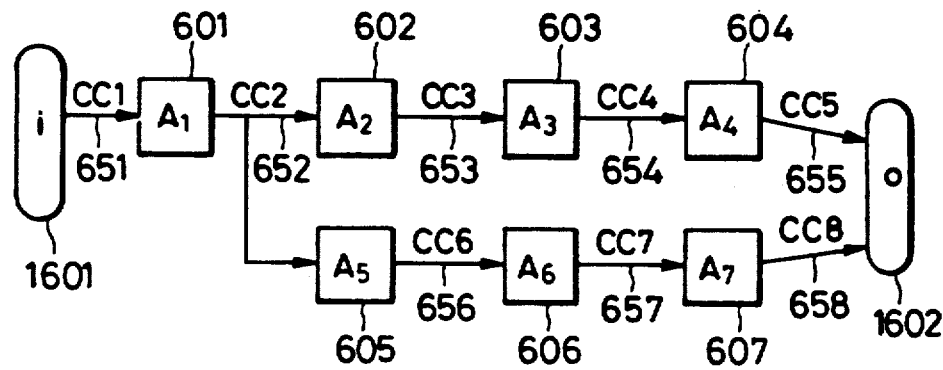
FIGS. 6(a) and 6(b) are diagrams showing examples of application programs which are set in the system shown in FIG. 2.
Figure 6B:
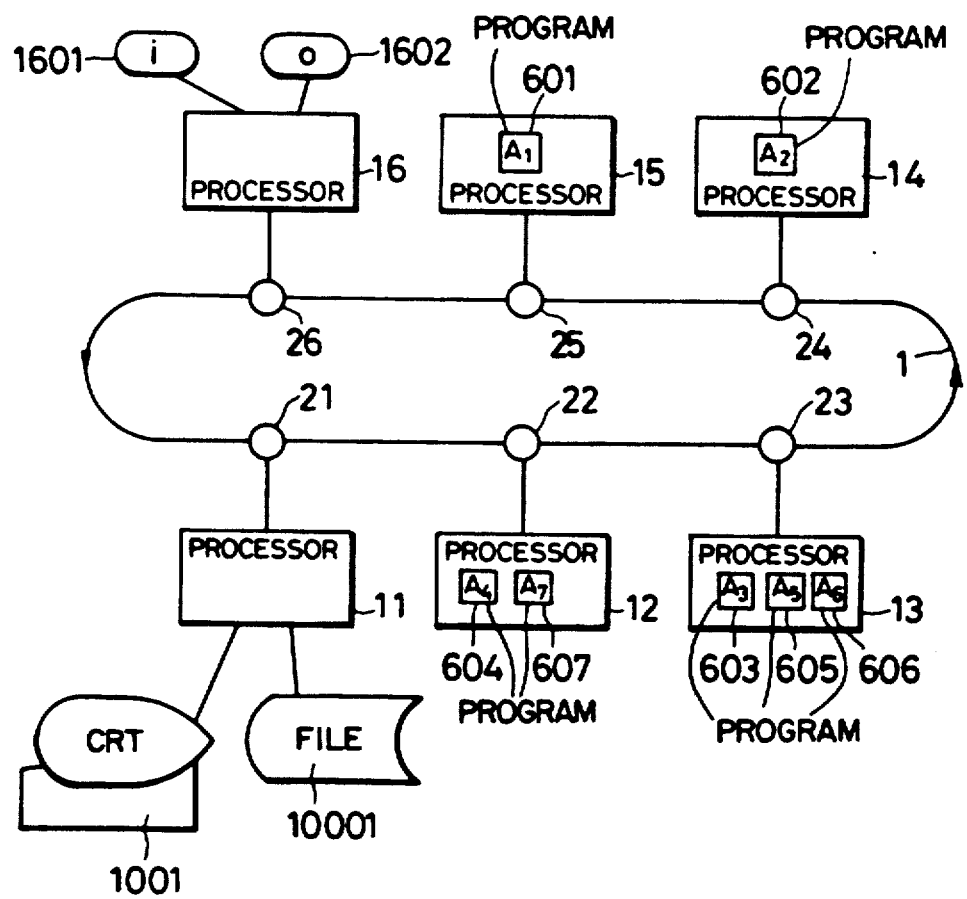

FIGS. 6(a) and 6(b) exemplify the application programs which are set in the system shown in FIG. 2. FIG. 6(a) schematically depicts the relation among the programs (the system flow). The processor 16 fetches data from the external input unit 1601, and supplies the transmission path with data 651 having a content code CC1. This data becomes the input data of a program $A_1$ (601). The program $A_1$ executes a process in accordance with the content of the input data 651, and outputs data 652 having a content code CC2 as the result. The data 652 becomes the input data of programs $A_2$ (602) and $A_5$ (605). The programs $A_2$ and $A_5$ execute processes according to the input data, and they output data items 653 and 656 having content codes CC3 and CC6, respectively. A program $A_3$ (603) is started by the data 653 and outputs data 654 having a content code CC4, whereupon a program $A_4$ (604) is started by data 654 and outputs data 655 having a content code CC5. Similarly, programs $A_6$ (606) and $A_7$ (607) are successively started by the data 656, and the program $A_7$ outputs data 658 having a content code CC8. The data items 655 and 658 are delivered to the external output unit 1602 by the processor 16. FIG. 6(b) is a diagram showing how the programs illustrated in FIG. 6(a) are arranged in the system. The program $A_1$ is set in the processor 15; the program $A_2$ in the processor 14; the programs $A_3$, $A_5$ and $A_6$ in the processor 13; and the programs $A_4$ and $A_7$ in the processor 11.

Figure 7A:
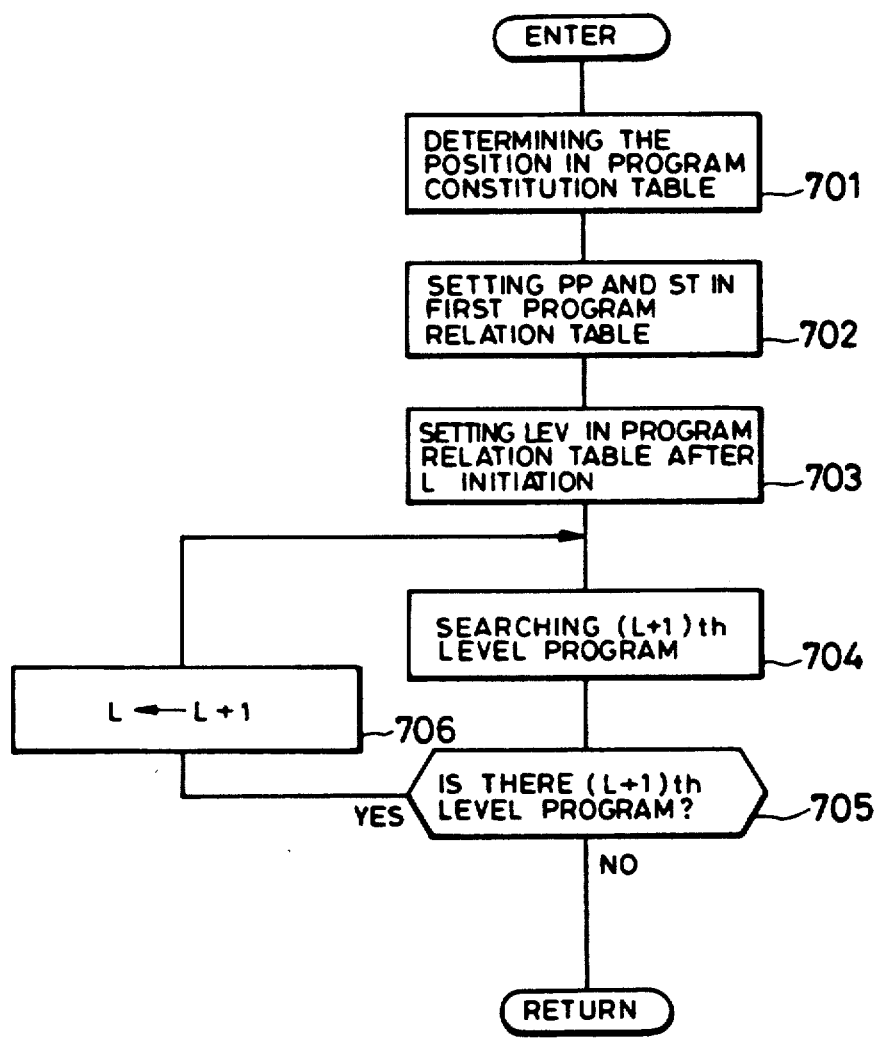
FIGS. 7(a) and 7(b) and FIG. 9 are diagrams showing examples of parts of the processing flow of the method of the present invention.
Figure 7B:
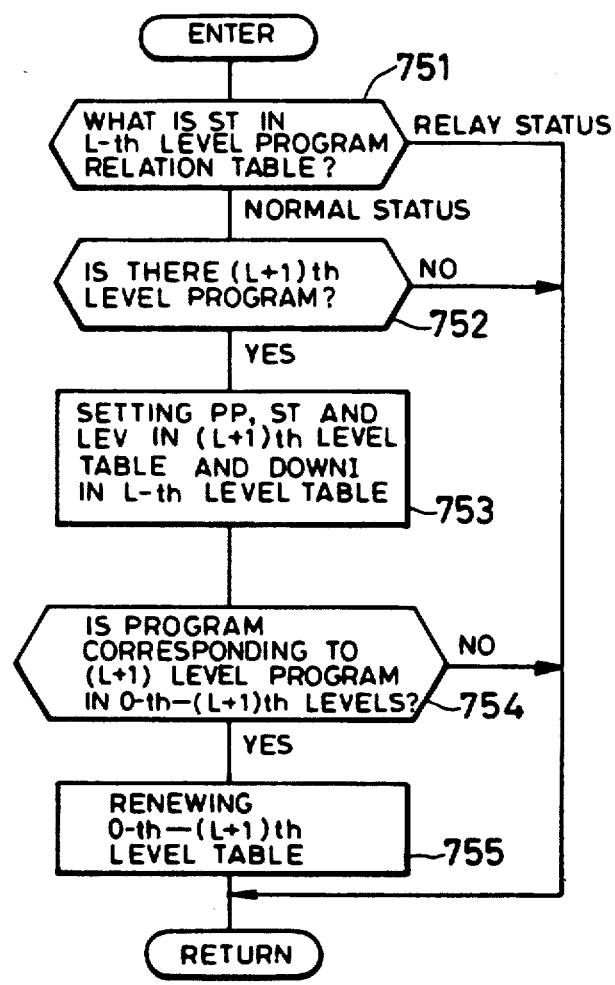
Figure 8:
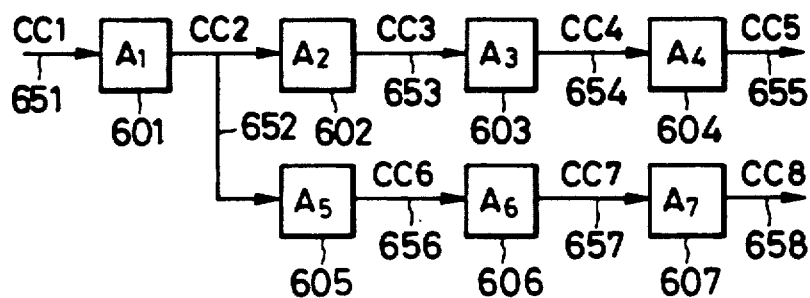
FIG. 8 and FIGS. 10(a) and 10(b) are diagrams showing examples of tables generated according to the present invention.
Figure 8:
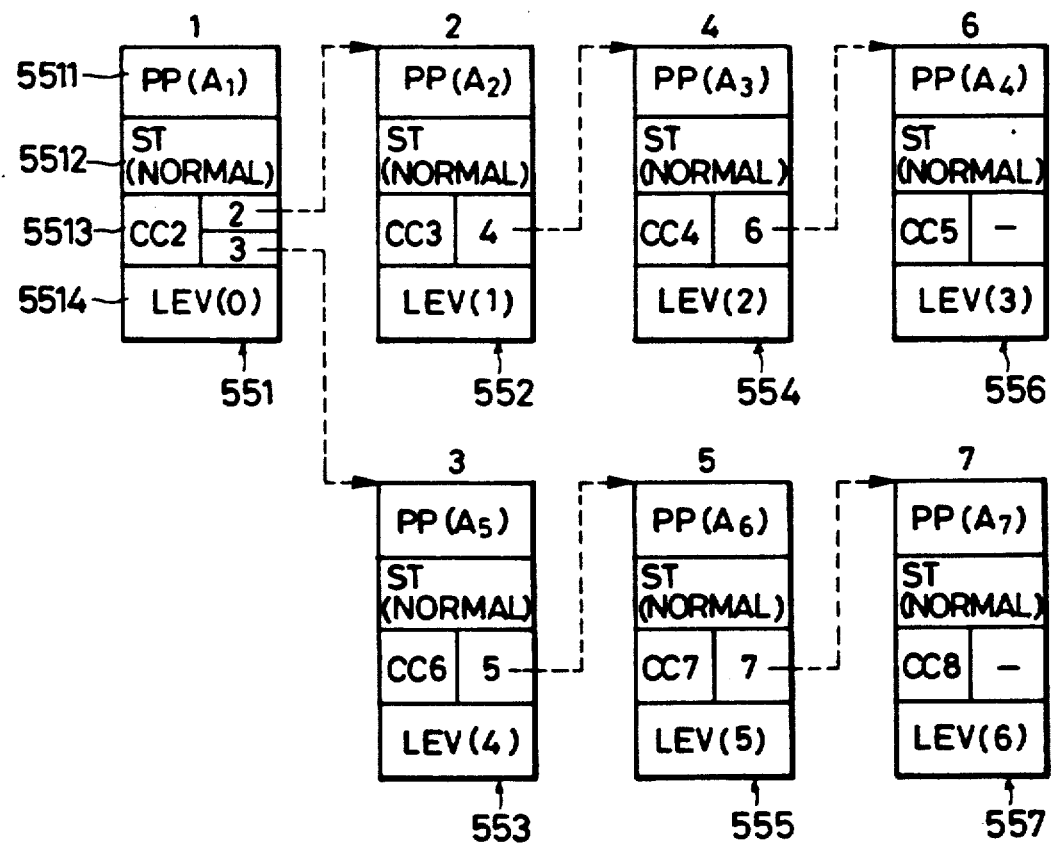

Hereunder, the program constitution shown in FIGS. 6(a) and 6(b) will be taken as a concrete example. First, the process of the step 1012 in FIG. 1 will be described with reference to FIGS. 7(a)-8. FIG. 7(a) shows a flow elucidating the contents of the process of the step 1012 in FIG. 1. It is now assumed that the program $A_1$ in the processor 15 shown in FIG. 6(b) has been designated by the step 1011 in FIG. 1. Then, the position of the designated program within the program constitution table shown in FIG. 4, namely, the program No. thereof is found (step 701). It is set in the area PP of the first program relation table (551 in FIG. 5(a)), and the normal status is set in the area ST (step 702). By the way, in a case where a content code has been designated by the step 1011 in FIG. 1, the program constitution table is searched for a program which is to be started by the data of the content code, and a program relation table corresponding thereto is set. Subsequently, a variable L indicative of a level (hereinafter, called "level variable") is made '0', and '0' is set in the area LEV of the program relation table 551 (step 703). Here, the expression "level" signifies a pointer whose value is set at '0' for the program to be first started within the system flow (the program $A_1$ in this case) and is increased in a manner to be '1' for an adjacent downstream program and '2' for a still downstream program. Next, the operating flow shifts to the processing step 704 of searching for a program or programs ($A_2$ and $A_5$ in this case) of the L-th level (the 0-th level in this case), to which the output data (652 in FIG. 6) of the program $A_1$ (601 in FIGS. 6(a) and 6(b)) is input. FIG. 7(b) shows the contents of the processing step 704. The process of FIG. 7(b) is carried out for all the program relation tables which belong to the L-th level. First, the table status area ST 5512 of the 0-th level program relation table indicates the normal status (step 751), so that the program constitution table is searched for a program or programs the content code of the input data of which is the content code CC2 of the output data of the program $A_1$ to-be-handled (step 752). Since, in this case, the programs $A_2$ and $A_5$ are the corresponding programs, program Nos. corresponding to the programs $A_2$ and $A_5$ are respectively set in the program pointer areas PP of the program relation tables 552 and 553 in FIG. 5(a). Besides, the normal status is set in the table status areas ST, and (L+1) (namely, '1') is set in the level areas LEV. Simultaneously therewith, program relation table Nos. corresponding to the program relation tables 552 and 553 are set in the downstream information area DOWNI of the program relation table 551 (step 753). Next, the operating flow shifts to a processing step 754. Since, in this case, the first level programs $A_2$ and $A_5$ and the 0-th level program $A_1$ are separate programs, the process (the step 704 in FIG. 7(a)) is ended in the above state. Subsequently, the operating flow shifts to a processing step 705 in FIG. 7(a), which decides whether or not a program relation table corresponding to the (L+1)-th level exists. Since, in this case, the programs $A_2$ and $A_5$ exist as the programs corresponding to the (L+1)-th level, namely, the first level, the operating flow shifts to a processing step 706, at which the level. variable L is renewed to '1' and which is followed by the processing step 704. Henceforth, the control operation is similarly performed until module relation tables are set as illustrated in FIG. 8. After the module relation tables have been set up to the third level, the fourth level program does not exist at the processing step 705, and hence, the processing step 1012 shown in FIG. 1 is ended.

Figure 9:
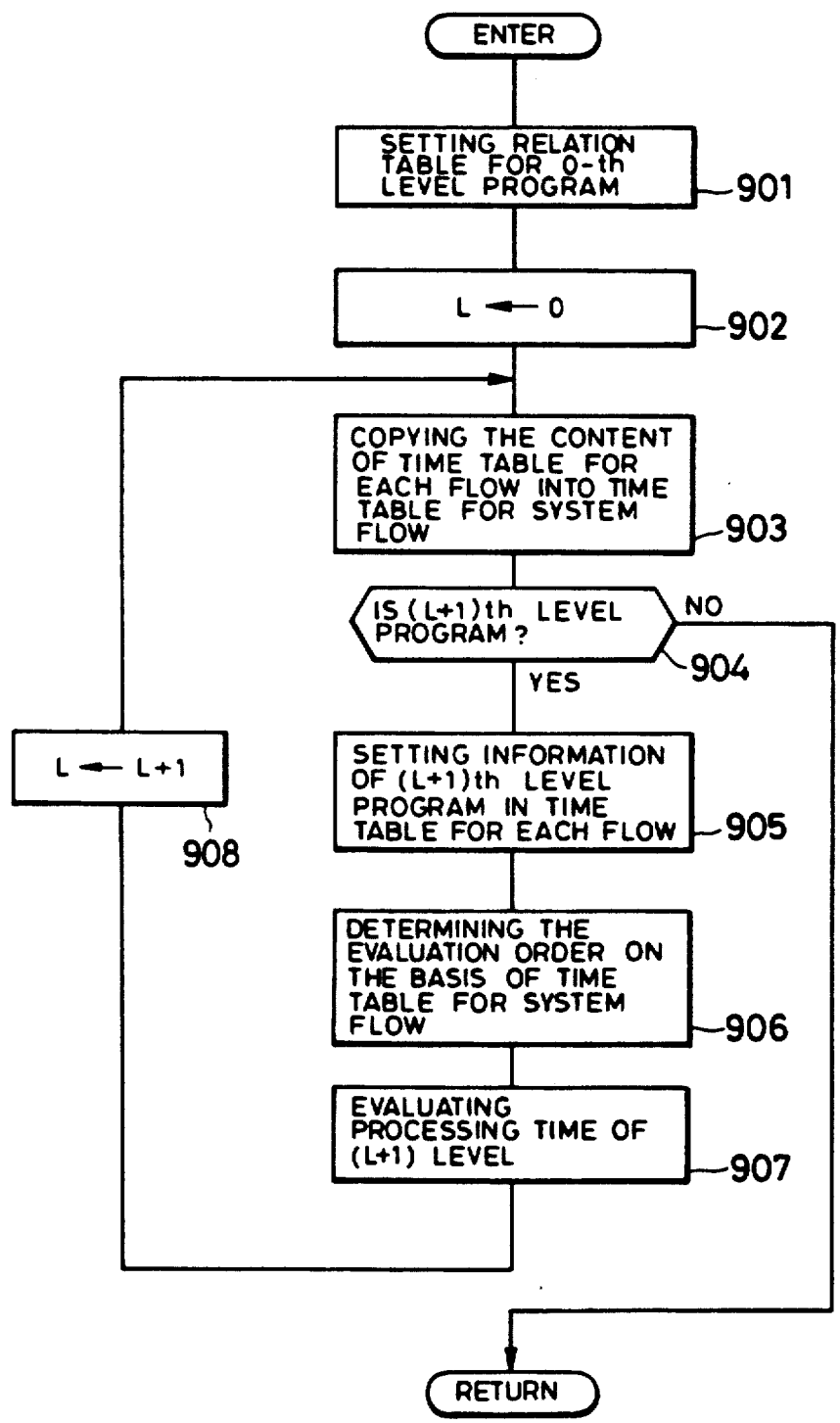
Figure 10A:
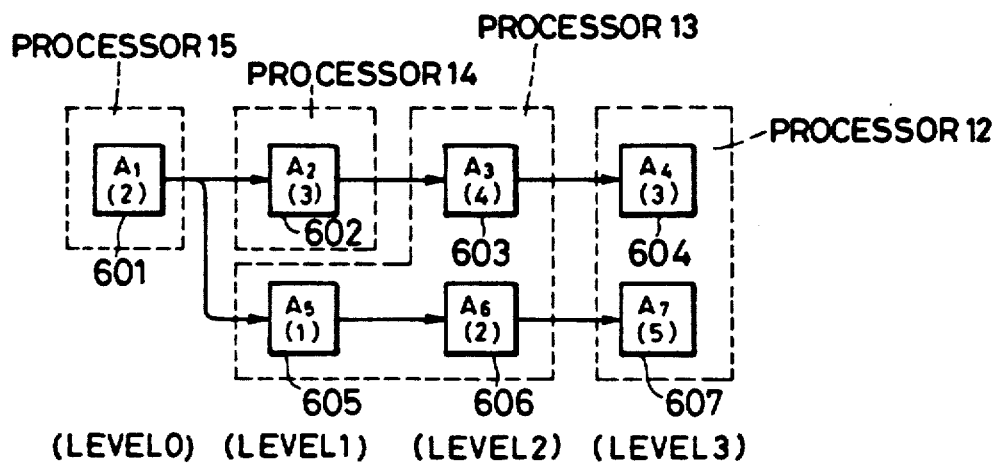
Figure 10B:
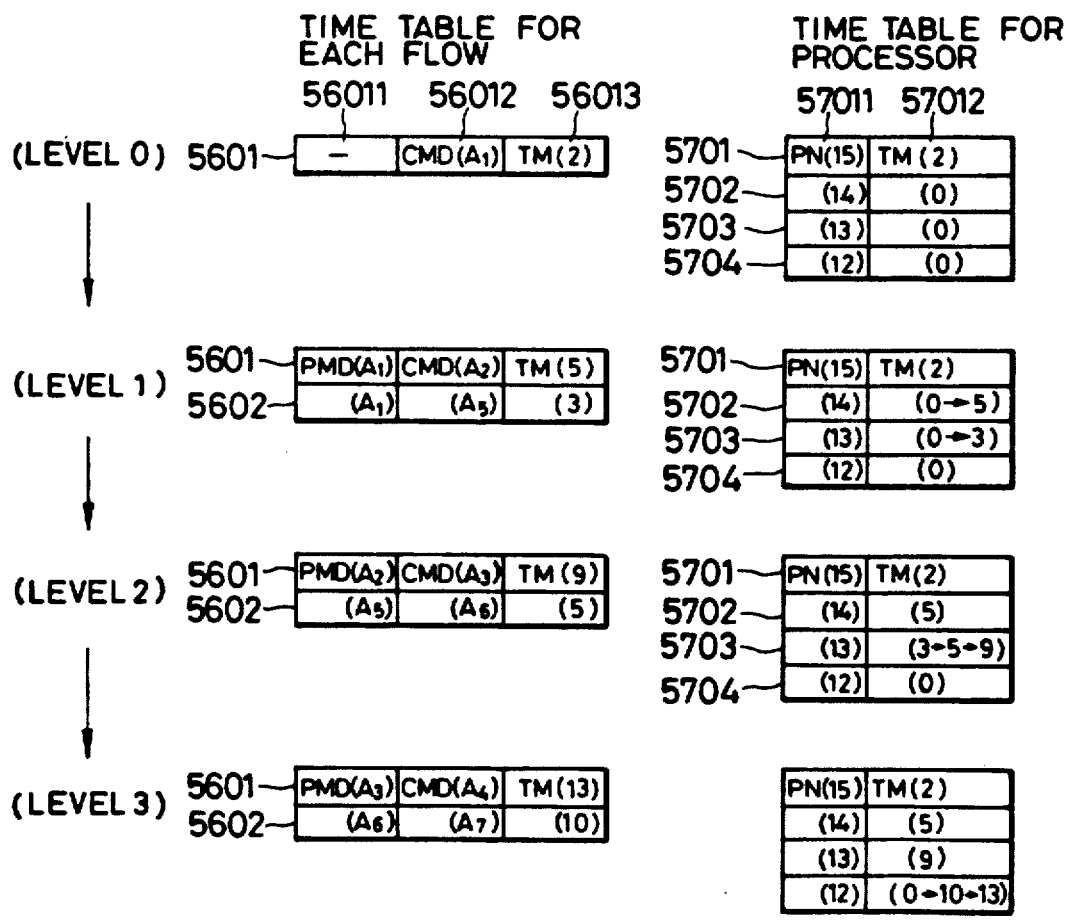

Next, the process of the step 1013 in FIG. 1 will be described with reference to FIGS. 9-10(b). FIG. 9 depicts a flow showing the contents of the processing step 1013 in FIG. 1. In addition, FIG. 10(a) shows a system flow to be handled here, and values indicated within ( ) for the respective programs are the processing times of the programs (that is, the contents of the areas TIME 4013 of the program constitution table in FIG. 4). In the process of the step 1013 in FIG. 1, the time table for flows (560 in FIG. 5(b)) and the time table for processors (570 in FIG. 5(b)) are first set in correspondence with the 0-th level program ($A_1$ in this case) as indicated at a step 901 in FIG. 9. Since the program $A_1$ is set in the processor 15, '2' being the processing time of the program $A_1$ is set in the area TM of that row of the time table for processors which corresponds to the processor 15. Besides, '0' is set in the areas TM of the rows corresponding to the other processors. Subsequently, information indicative of the program $A_1$ (concretely, the value of the area PP of the module relation table) is set in the area for the current level program, CMD at the first row of the time table for flows, and the processing time '2' of the program $A_1$ is set in the area for the elapsed time, TM (refer to level 0 in FIG. 10(b)). Next, '0' is set as the level variable L, whereupon the contents of the "time table for flows" are copied in the "time table for previous-level flows" shown in FIG. 5(b) (step 903). Thereafter, whether or not a program of the (L+1)-th level exists is decided (step 904). Since, in this case, the programs $A_2$ and $A_5$ exist as the first level programs, the operating flow shifts to a processing step 905. At the processing step 905, the items of the time table for flows are set in correspondnece with the programs of the (L+1)-th level. The programs $A_2$ and $A_5$ exist at the first level, both the upstream programs thereof are the program $A_1$, and the area ST of the module relation table corresponding to the program $A_1$ indicates the normal mode, so that the program No. of the program constitution table corresponding to the program $A_1$ is set in the upstream program area PMD at the first row 5601 of the "time table for flows," and the program No. corresponding to the program $A_2$ is set in the current level program area CMD. Likewise, the program Nos. corresponding to the programs $A_1$ and $A_5$ are respectively set in the areas PMD and CMD at the second row 5602 of the "time table for flows" (level 1 in FIG. 10(b)). Subsequently, the (L+1)-th level program from which the processing time is evaluated is determined on the basis of the contents of the "time table for previous-level flows" (step 906). The determination here is done in conformity with the following evaluation order determinant criteria:

Evaluation Order Determining Criteria (1) The evaluation is started from a program lying downstream of a program at that row of the "time table for previous-level flows" which has a smaller value in the elapsed time area TM.

(2) In a case where, in the criterion (1), a plurality of programs lie downstream of the program at the row having the smaller TM value, the evaluation order of the plurality of programs is determined on the basis of a criterion given beforehand (for example, the order in which they have been registered).

In the case of FIG. 10(a) to be handled here, only the program $A_1$ exists upstream of the first level programs $A_2$ and $A_5$, and this case falls under the criterion (2). On this occasion, the evaluation shall be started from the program $A_2$ on the basis of the criterion given beforehand.

Subsequently, the processing times of the respective programs at the (L+1)-th level are evaluated according to the evaluation order determined by the processing step 906 (step 907). The evaluation here is done in conformity with the following processing time calculative formulas:

Processing Time-Calculating Formulas (1) Case where a subject program and the upstream program thereof are set in different processors;

max {(TM value of the row of the "time table for previous-level flows" corresponding to the flow to which the subject program belongs), (TM value of the row of the "time table for processors" corresponding to the processor in which the subject program is set)}+(processing time of the subject program)

Here, when the subject program is started by a plurality of input data items, the maximum one of the TM values of the "time table for previous-level flows" corresponding to the flows to which the programs outputting the input data items belong is taken as the first term of max { }.

(2) Case where a subject program and the upstream program thereof are set in an identical processor;

(TM value of the row of the "time table for processors" corresponding to the processor in which the subject program is set)+(processing time of the subject program)

On the basis of the above calculative formulas, the program $A_2$ is evaluated as follows: Since the program $A_2$ (processor 14) and the upstream program $A_1$ thereof (processor 15) are set in the separate processors, $$\max \{2, 0\} + 3 = 5$$

is calculated according to the calculative formula (1). This value is set in the area TM of the row of the "time table for processors" corresponding to the processor 14 to which the program $A_2$ belongs. Besides, this value is set in the area TM of the row of the "time table for flows" corresponding to the flow to which the program $A_2$ belongs.

Subsequently, the program $A_5$ is evaluated. Since also the program $A_5$ (processor 13) is set in the processor separate from that of the program $A_2$, $$\max \{2, 0\} + 1 = 3$$

is calculated according to the calculative formula (1). This value is set in the area TM of the row of the "time table for processors" corresponding to the processor 13. Besides, this value is set in the area TM of the row of the "time table for flows" corresponding to the flow to which the program $A_5$ belongs (level 1 in FIG. 10(b)). Thus, the processing step 907 for L=0 is ended. Subsequently, the level variable L is incremented by one (step 908), and the operating flow returns again to the processing step 903, at which the contents of the "time table for flows" are copied in the "time table for previous-level flows." Next, since programs ($A_3$, $A_6$) at the (L+1)-th level (namely, the second level) exist (step 904), the operating flow shifts to the processing step 905, at which the areas PMD and CMD of the "time table for flows" are set similarly to the preceding time (level 2 in FIG. 10(b)). Subsequently, the operating flow shifts to the processing step 906, at which either of the programs $A_3$ and $A_6$ to be evaluated earlier is determined. In this case, the programs $A_6$ and $A_3$ are evaluated in this order at the processing step 907 in accordance with <Evaluation order determining criterion> (1). Since both the program $A_6$ and the upstream program $A_3$ thereof lie in the processor 13, $$3 + 2 = 5$$

is calculated in accordance with <Processing time-calculating formula> (2). This value is set in the area TM of the row of the "time table for processors" corresponding to the processor 13. Besides, this value is set in the area TM of the row of the "time table for flows" corresponding to the flow to which the program $A_6$ belongs. Subsequently, since the program $A_3$ (processor 13) and the upstream program $A_2$ thereof, (processor 12) lie in the separate processors, $$\max \{5, 5\} + 4 = 9$$

is calculated in accordance with <Processing time-calculating formula> (1). This value is set in the area TM of the row of the "time table for processors" corresponding to the processor 13. Besides, this value is set in the area TM of the row of the "time table for flows" corresponding to the flow to which the program $A_3$ belongs (management tables of level 2 in FIG. 10(b)). Thus, the process for L=1 is ended. Thenceforth, the process is similarly carreid out according to the flow of FIG. 9 until the "time table for flows" of level 3 in FIG. 10(b) is eventually obtained. Owing to this table, it is found that, in the case of the system flow shown in FIG. 10(a), the processing time taken since the start of the program $A_1$ till the end of the program $A_4$ is 13, while the processing time taken till the end of the program $A_7$ is 10.

Owing to the method stated above, the operations of the respective programs can be simulated merely by setting the input/output data items and processing times of the individual programs and information items on the processors in which the programs are stored.

By the way, although in the embodiment a transmission delay which arises at the data transfer between the programs is assumed to be null, the performance evaluation with the transmission delay taken into consideration can be done in such a way that a data transfer time within the processor and a data transfer time between the processors are given as additional information and that the transfer times are added when the processing time of the system flow is calculated.

Besides, although the embodiment has referred to only the case of the single system flow, the performance evaluation can be done by applying the method even in such a case where a plurality of system flows run in parallel.

Besides, although the embodiment has referred to the case of the system wherein the programs are distributively arranged in the plurality of processors, naturally the method is also applicable to a system constructed of only a single processor.

Besides, although the embodiment has referred to the example in which the method is executed by the processors connected to the transmission path, processors for executing the method need not be connected to the transmission path.

According to the present invention, in a system wherein a series of processes are executed by a plurality of programs, the operations of the respective programs can be simulated merely by defining the input/output data items and processing times of individual programs and processors in which the programs are stored. Thus, it becomes possible to easily evaluate the performance, responsiveness etc. of a designed system in case of a system design, so that the efficiency of development of software rises. Moreover, problems concerning the performance (a bottleneck, etc.) can be easily detected at the stage of the design by the method of the invention, so that the reliability of the software is enhanced.

We claim:

1. A method for simulating processing of a multiple of program modules in a distributed processing system including a plurality of processors, an input-output device and a memory, comprising the steps of:

storing in said memory a table including information relating to input/output data and processing time of each program module and information of a processor in which each program module is processed;

inputting input/output data and processing time of a program module to be simulated from said input-/output device to a processor;

producing, at said processor, a system flow diagram including said multiple of program modules, said system flow diagram defining an interrelational order of said multiple of program modules based on said input/output data;

evaluating, at said processor, processing time of processings defined by said system flow diagram based on processing times of respective program modules included in said system flow diagram; and outputting a result of said evaluating step.

2. A method for simulating processing of a multiple of program modules in a distributed system including a plurality of processors, an input/output device and a memory in which said multiple of program modules are distributed, comprising the steps of:

storing in said memory a table including information relating to input/output data and processing time of each program module and information of a processor in which each program module is processed;

inputting input/output data and processing time of a program module to be simulated from said input-/output device to a processor;

producing, at said processor, a system flow diagram including said multiple of program modules, said system flow diagram defining an interrelational order of said multiple of program modules based on said input/output data;

evaluating, at said processor, performance of the system based on processing time of respective program modules having said interrelational order of said multiple of program modules defined by said system flow diagram; and outputting a result of said evaluating step.

3. A simulation method as defined in claim 1 or 2, wherein said system flow diagram is used for evaluating performance of said system and is prepared on the basis of said input/output data.

4. A simulation method as defined in claims 1 or 2 wherein:

said input/output data and said processing time are inputted for each of the program modules.

5. A simulation method as defined in claims 1 or 2, wherein:

for respective program modules in said system, information items of input/output data, processing times of the program modules and numbers of processors in which the program modules are stored are defined.

6. A simulation method as defined in claim 5, wherein a performance of said system is evaluated on the basis of the defined information items.

* * * * *